Feb. 23, 1965    R. E. MARRS    3,170,344
METHOD AND APPARATUS FOR CONTROLLING THE
THICKNESS OF ROLLED STRIP MATERIAL
Filed Sept. 19, 1961    2 Sheets-Sheet 1
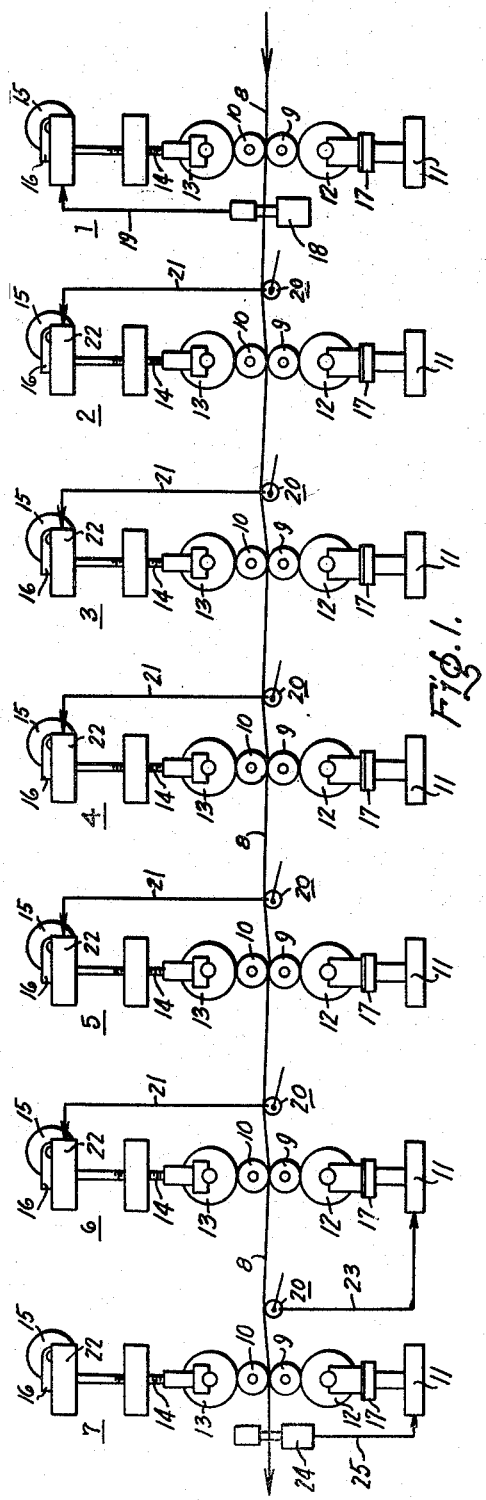
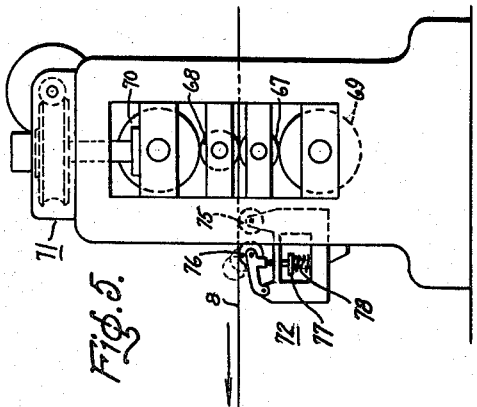
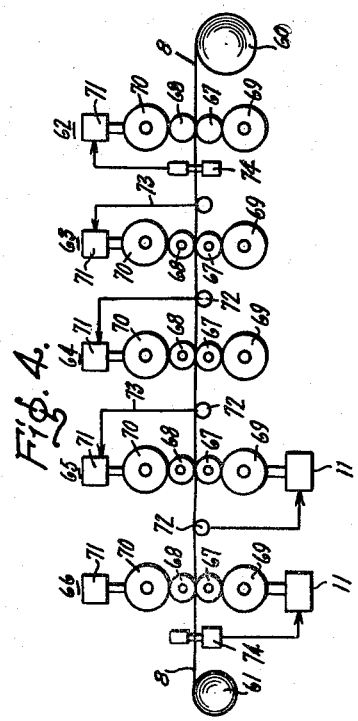
Inventor
Roscoe E. Marrs
by Paul A. Frank
His Attorney

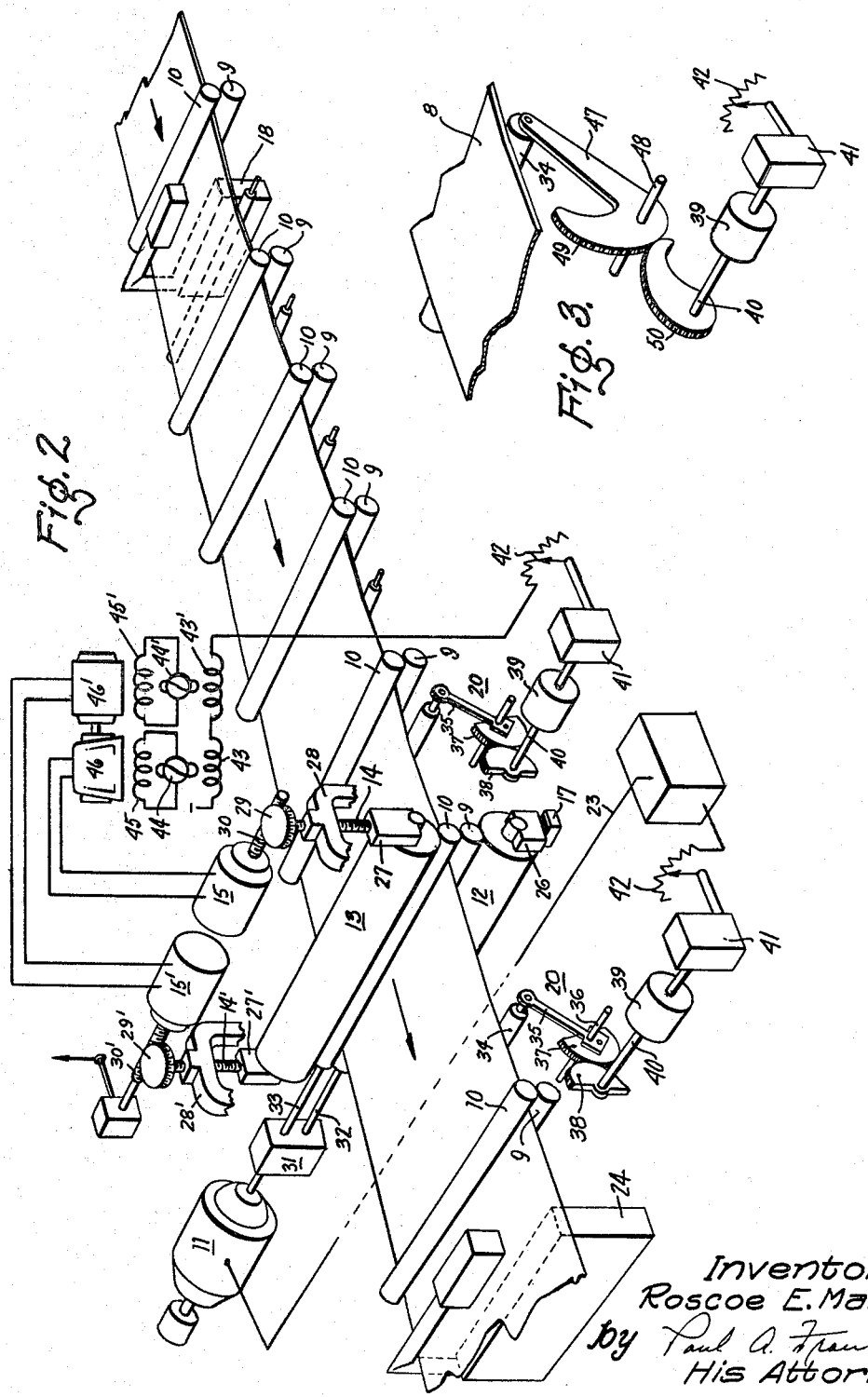

United States Patent Office 3,170,344
Patented Feb. 23, 1965

3,170,344
METHOD AND APPARATUS FOR CONTROLLING
THE THICKNESS OF ROLLED STRIP MATERIAL
Roscoe E. Marrs, Schenectady, N.Y., assignor to General
Electric Company, a corporation of New York
Filed Sept. 19, 1961, Ser. No. 139,193
7 Claims. (Cl. 80—35)

My invention relates to methods and apparatus for reducing the thickness of strip material by subjecting the material to successive rolling operations, in each of which the thickness of the material is reduced a controllable amount.

In the reduction of the thickness of materials, such as, for example, reducing the thickness of a strip material by passing it through either a hot strip mill or a cold rolling mill of the tandem type, one of the major problems is maintaining the thickness of the final strip material at a constant gage value. The value of constant gage material of desired thickness is evident in that such material not only results in reduced expense for the manufacture of the material, but also provides reduced expense in subsequent manufacturing operations which use the material. On the other hand, in a thickness reducing operation such as a hot strip mill, there are many factors which tend to promote variation in the thickness of the output strip. These include decrease in temperature from the beginning to the end of the strip material, excessive changes in the temperature of the material which occur when the front end enters the rolling operation or when the rear end emerges from each rolling stand. Additional contributing factors are cold spots in the material which are produced by skids and other supports used in conveying the material from a furnace or roughing operation to the final mill.

In addition to the foregoing major factors, there are many other conditions that produce undesired variations in the thickness or gage of the output strip. These include the mill spring or elastic constant of the mill, wear of the working rolls, variations in metallurgical properties and in the width of the strip material, slippage between the rolls and the material, eccentricity in the rolls or variations in the speed of the rolls, and undesired irregularities in the screws which adjust the pressure on the rolls, such as irregularities in methods of adjustment or of the level of the screws.

Actually, what is desired in a thickness reducing process which employs successive rolling operations, if it is assumed that the variation in the width of the material is negligible, is to maintain a constant mass flow of the material through the successive rolls. By "constant mass flow" is meant that the product of the thickness of the material times its speed remains constant for all rolls or pressure points through which the material passes.

In the past, many attempts have been made to achieve this result. For example, one system for attempting to obtain uniform thickness of strip material measured the separating force between rolls through which the material passes on the assumption that if such separating force varied, then the thickness of the material leaving the reducing member or roll would vary similarily. However, such system fails to recognize the fact that, in rolling strip material, many times hard spots are encountered in such material, and since the separating force varies with ductility of the material, it is not a true measure of the thickness when a hard spot of material is passing between the rolls. In another arrangment, the thickness of the material is measured by means of an X-ray thickness gage after it passes through a roll or pressure point, and this measurement is used to control the force on the roll. This amounts to an adjustment after the fact, so that usually it is impossible to provide continuous thickness control. Furthermore, in such a system, although pressure is applied to the material at a number of spaced points in its travel, measurement by a thickness gage is made after the material passes through the first such point only, and the pressure at such first point is adjusted accordingly. It has been found impractical for economic reasons to use an X-ray thickness gage after each such roll or pressure point to provide a continuous control of thickness.

It is an object of my present invention to provide methods and apparatus for reducing the thickness of strip material in which control of such thickness is obtained over the entire length of the strip.

It is another object of my invention to provide a new and improved method and apparatus for controlling the thickness of a strip material by maintaining constant the tension in such material as it is being reduced in thickness.

It is another object of my invention to provide a new and improved method and apparatus for reducing the thickness of strip material which automatically corrects for changes or variations in the rolls used to reduce such material, including changes in the crown of the roll or variations in roll dimensions because of changes in temperature.

It is still another object of my invention to provide a new and improved method and apparatus for reducing the thickness of strip material by means of a multistand rolling mill in which distribution of the loads on the motor drives for the respective rolls may be adjusted by regulating or varying the speeds of the individual motors.

In its broadest aspect, my invention provides uniform thickness of output strip material which is subjected to successive rolling operations by maintaining substantially constant the mass flow of the material through each rolling operation. One of its features consists in sensing the tension in such material in advance of its entry between a pair of rolls or pressure point and adjusting the pressure applied to the material at such point to maintain constant the tension in the material in advance of the point. As used herein, the term "tension" is used to indicate the tensile stress in a strip of material being reduced in thickness and the term "mass flow" to indicate the quantity of material passing a given point per second of time. The term "pressure point" is used to indicate that point in the travel of the strip material at which pressure is applied to the strip by a pair of rolls or equivalent means.

The novel features which I believe to be characteristic of my invention are set forth with particularity in the appended claims. My invention itself, however, may best be understood by reference to the following description taken in connection with the accompanying drawings.

In the drawings, FIGURE 1 is a schematic view of a multistage rolling mill embodying my invention;

FIGURE 2 is a perspective view illustrating certain portions of the mill of FIGURE 1;

FIGURE 3 is a perspective view of a modified control used in the view of FIGURE 1;

FIGURE 4 is a schematic view of a five-stand tandem cold mill embodying my invention; and FIGURE 5 is a detail view of a portion of the mill of FIGURE 4.

In FIGURE 1, I have shown schematically a hot strip mill comprising seven stands, 1–7, which successively apply pressure to a strip of material, such as the strip 8, moving from right to left, to reduce the strip material to a final desired thickness. In a typical hot strip mill of this type, the strip 8 has been previously brought to an approximate width and thickness by a series of reducing steps in a roughing mill. Each of the stands 1–7 comprises a pair of work rolls 9, 10 driven by a motor 11. Pressure on the material between the rolls 9, 10 is exerted by means of backup rolls 12, 13 and a screwdown device 14, whose position is regulated by means of a motor 15, whose operation, in turn, is regulated by means of a screwdown control 16. The initial pressure between the rolls 9, 10 or the opening between those rolls is adjusted customarily by utilizing a load cell 17, upon which pressure is exerted by backup roll 12.

In order to measure the thickness of the strip 8 after it passes through the rolls 9, 10 of stand 1, I provide an X-ray thickness gage 18 which supplies control signals to screwdown control 16 over conductor 19. Such an X-ray thickness gage may be of a conventional type: for example, that disclosed in United States Patent No. 2,723,350—Clapp, and assigned to the assignee of this invention. As a result of the operation of the X-ray gage to control the pressure applied on strip material 8 between rolls 9, 10 of stand 1, the material, after passing through these rolls, will be the thickness desired.

The pressures between rolls 9, 10 of the remaining stands 2–7 are initially adjusted in the manner described in connection with stand 1 to provide a thickness of material emanating from each of these sets of rolls which is approximately that desired to give a desired thickness to the final or output strip which flows from rolls 9, 10 of stand 7. Between stands 1 and 7, it is desirable to reduce the thickness of the material in gradual steps to obtain a desired distribution of the loads on the driving motors of the stands. One measure of achieving this result is to obtain desirable limits of the tension, or tensile stress, in the material between different sets of stands. In order to maintain tension in the material constant, I provide tensioning devices 20 which may take, for example, the form of upwardly biased rollers which engage the strip of material between each two sets of pressure rolls 9, 10. As will be explained later, each of the tensioning devices 20 supplies a signal over a conductor 21 to the screwdown control 22 of the next succeeding stand. By controlling the position of the screwdown motors or drives 12 of each of these stands, each tensioning device 20 is operative to maintain the tension in the strip 8 constant. In this fashion, despite the occurrence of any hard spots in the strip 8 or any portion of reduced thickness caused by elongation of the material as it passes through a preceding set of rolls, each tensioning device 20 is operative to adjust the opening between the sets of work or pressure rolls 9, 10 of the next mill stand to maintain a constant tension in the strip.

In the case of the tensioning device 20 positioned between stands 6 and 7, the signal from that device, rather than being operative to control the pressure of stand 7, is supplied over conductor 23 to driving motor 11 of stand 6 to control the speed of rolls 9, 10 of stand 6. Since the opening between rolls 9, 10 of final stand 7 is preset to the final thickness desired for the strip, I provide a second X-ray gage 24 positioned above the strip at the output of stand 7 to supply a signal over conductor 25 to driving motor 11 of stand 7 to control the speed of such motor. Should there be any deviation from the desired thickness, the signal supplied by X-ray thickness gage 24 modifies the regulated speed of stand 7 so that the resultant change in the actual strip tension produces a corrective influence on the strip thickness.

FIGURE 2 shows a perspective view of a portion of the apparatus employed in my invention. This figure illustrates how backup roll 12 is supported in a bearing block 26 and pressure on backup roll 13 is exerted through bearing block 27 and screw 14 which engages bearing block 27. Screw 14 passes through a threaded support member 28 and at its upper end carries a gear 29 which is driven by a worm or pinion 30 attached to the shaft of motor 15. Duplicate apparatus is provided for the two sides of the backup rolls 12, 13, the apparatus for the left hand sides of these rolls being indicated by primed reference numerals. Drive motor 11 supplies power to the work rolls 9, 10 through a gear box 31 and a pair of shafts 32, 33 connected, respectively, with the rolls 9, 10.

The tensioning device 20 comprises a roller 34 carried by arm 35 which is pivoted about an axis 36. Arm 35 carries a gear 37 which engages a cooperating gear 38. A motor 39, having a shaft 40 which carries gear 38, operates through members 34–38 to provide a constant tension in the strip 8. The motor 39 preferably is a type MD motor conventionally used in rolling mills and frequently referred to as a torque motor. Any change in the position of roll 34 required to maintain such constant tension is operative to shift the position of the armature of motor 39 and, through a connecting gear box 41, the position of a control device such as, for example, a rheostat 42 of the tensiometer. Rheostat 42, in turn, is connected in the circuit of the energizing fields 43, 43' of amplidynes 44, 44', whose armatures supply excitation current to the fields 45, 45' of two direct current generators 46, 46'. Direct current generators 46, 46', in turn, supply operating voltages to screwdown motors 15, 15'.

FIGURE 2, which shows a partial view of the apparatus of stand 6, illustrates how the tensioning device 20 which precedes stand 6 supplies a control voltage to screwdown motors 15, 15' of stand 6 while the tensioning device 20 which succeeds stand 6 supplies a control voltage to driving motor 11 for rolls 9, 10. As has been pointed out previously in the description of my invention, the use of two tensioning devices to control the operation of a single stand is peculiar to stand 6. For all other stands, the tensioning device 20 which precedes the stand is operative to supply only a control voltage to the screwdown motor, the speed of each other stand being regulated in a conventional manner in such mills to maintain the desired constant speed for the work rolls of each stand. Obviously, this speed will be different for each stand in order that, in accordance with my invention, the mass flow of material through the successive stands remains constant. As the thickness of the material is reduced as it progresses through the mill, the speed of the work rolls of each succeeding stand is increased so that the product of the speed of the strip times its thickness remains substantially constant.

In FIGURE 3, I have shown an alternative arrangement for the gears 37, 38 of FIGURE 2. Thus, in FIGURE 3, the tension roll 34 is carried by an arm 47 pivoted about an axis 48. Arm 47 and the shaft 40 of motor 39 carry cooperating nonlinear gears 49, 50 which assist to provide a constant tension in strip 8 as roll 34 moves upwardly. Since driving motor 39 is of the type which preferably supplies a constant torque, nonlinear gears 49, 50 are operative to supply constant torque to roll 34.

In the operation of the apparatus of FIGURES 1–3, the initial opening between rolls 9, 10 of stand 1 is set according to the thickness of the slab or work piece which enters that stand, and the openings between the work rolls of succeeding stands are all adjusted by their separate screwdown motors to gradually reduce the thickness of the strip material so that its ultimate thickness is of a desired value. In the operation of the mill, my invention provides constant tension in the strip material as it proceeds through the mill by adjusting the openings of each successive set of work rolls 9, 10 in conjunction with the speed of the motors driving those work rolls so that the volume or mass flow delivered by each stand to the next succeeding stand is substantially constant. In order to achieve this result, the tensioning device 20 senses or measures the amount of strip tension and, in accordance with variations of that strip tension from a desired value, provides a signal to the screwdown motor of the next succeeding stand to enlarge or reduce the opening between the drive rolls 9, 10 of each next succeeding stand to change the tension in the strip between the two stands so that the tensioning device returns to its preselected position at which the tension in the strip is at desired value. For example, if tensioning device 20 between stands 3 and 4 rises vertically because of the lack of tension between these stands, the device is operative to provide a control voltage to the screwdown motors 15, 15' of stand 4 which momentarily reduces the pressure on the strip as it passes between rolls 9, 10 of stand 4, permitting the material mass flow through stand 4 to increase until the tensioning device returns to its desired operative position.

When the thickness of the material which flows through stand 1 is constant as determined by X-ray thickness gage 18, and the relative speeds of each set of drive rolls are held constant and the positions of the tensioning devices 20 throughout the mill do not change, then the thickness of the strip material delivered at the output of stand 7 is constant. When, however, a section of hardened material, caused, for example, by cooling produced by skids or other apparatus which contacted the strip, passes through stand 1, it causes tensioning device 20 between stands 1 and 2 to lower and, in turn, bring the work rolls 9, 10 of stand 2 closer together to press or iron out the hard spots and restore the tensioning device 20 to its desired position. Each tensioning device 20 between the remaining sets of stands responds in a similar manner to this decreasing thickness caused by such a hard spot so that by the time this section of the strip material is delivered from stand 7, it is of a desired gage or thickness.

When an undesired tension is found to exist between stands 6 and 7, the signal produced by the change in position of tensioning device 20 is supplied over conductor 23 to drive motor 11 to increase or decrease its speed so that the speed of motor 11 responds to the direction in which the tensioning device 20 is moved until a correct position of the device 20 is restored. If a change in the speed of motor driving rolls 9, 10 of stand 6 causes the tensioning device 20 positioned between stands 5 and 6 to change its position, a voltage is provided to the screwdown motors of stand 6 to produce a change in the opening between rolls 9, 10 of stand 6 in a direction to help restore tensioning device 20 between stands 5 and 6 to its desired position. While I have shown that the signal from device 20 from stands 6 and 7 is used to control the speed of the drive motor of the preceding stand, it is obvious that any combination of speed and screwdown control may be obtained by use of the signals obtained from variations in the positions in any one of the positioning devices 20.

In FIGURE 4, I have illustrated my invention as applied to a typical five-stand tandem cold mill. In such a mill, the strip material 8 is initially coiled on a reel 60 and, after reduction in thickness, is wound on a winding reel 61. Between the reels 60, 61, the strip material is subjected to successive pressure operations, in each of which the thickness of the material is reduced. These operations in the apparatus of FIGURE 4 are effected by means of stands 62, 63, 64, 65, 66, each stand comprising a pair of work or pressure rolls 67, 68 upon which force is exerted by cooperating back-up rolls 69, 70. Pressure on the upper backup roll 70 is exerted by means of a screwdown motor 71. An X-ray thickness gage 74 positioned between stands 62, 63 provides a signal to control the pressure exerted by motor 71 on roll 70 of stand 62 to effect the initial reduction in the thickness of strip 8. A tensioning device 72 is located between stands 62 and 63 and biased upwardly against strip 8 to provide a signal in accordance with its deflection from a desired position. This signal is supplied over conductor 73 to the screwdown motor 71 of stand 63 to adjust the force exerted on strip 8 as it passes through stand 63. Similar tensioning devices 72 are provided between the remaining sets of stands. Again, as in the case of the apparatus of FIGURE 1, the output signal from tensioning device 72 between stands 65 and 66 is used to control the speed of the motor 11 driving rolls 67, 68 of stand 65. An additional X-ray thickness gage 74 positioned beyond the point of delivery from stand 66 provides a signal to control the speed of the driving motor 11 of stand 66 for operation in accordance with principles discussed in connection with the operation of the apparatus of FIGURES 1–3.

FIGURE 5 illustrates certain details of a typical stand of the apparatus of FIGURE 4. In this case, the tensioning device 72 comprises a fixed roller 75 and a pivoted roller 76, the latter being operative to move a core 77 relative to a coil 78 to provide a signal varying with the position of roller 76. This signal is, in turn, used to control the operation of the screwdown motor and vary the force exerted between the pressure rolls 67, 68 of the succeeding stand, as described in connection with the apparatus of FIGURE 4. While the tensiometer illustrated is of a well known type manufactured by the General Electric Company as type GO–4N, any other similar satisfactory tensiometer may be employed with the apparatus of FIGURES 4 and 5.

In the operation of the apparatus for reducing the thickness of strip material embodying my invention, one important advantage is immediately apparent in that since the thickness of the material delivered at the output of the reducing apparatus is substantially uniform and kept closely to a desired final thickness, the total length of strip obtained for a given amount of material is increased. Thus, by sensing the tension in the strip before it enters a pressure point and adjusting the pressure at that point to maintain the tension constant, the thickness of the output strip is held substantially uniform, resulting in fewer over-gage sections and greater total length of output strip for an input volume.

In the operation of the apparatus, when the end of the strip of material leaves the number 6 stand, for example, in the apparatus of FIGURE 1, a loss of strip tension may tend to increase the gage. Therefore, it is desirable to utilize the X-ray thickness gage to control the thickness of the final product. Also, it is desirable that the thickness of the strip of material as it leaves the number 6 stand should approach as nearly as possible the desired final thickness with a minimum amount of tension in the strip when it passes into the last stand.

Another important advantage is that by utilizing changes of tension in the strip of material to control the pressure exerted at the next succeeding pressure point, my invention automatically corrects for changes or variations in the rolls used at the pressure point to reduce the material.

While I have shown and described particular embodiments of my invention, it will, of course, be understood that I do not wish to be limited thereto since various changes and modifications may be made without departing from my invention, and I contemplate by the appended claims to cover all such changes and modifications as fall within the true spirit and scope of my invention.

What I claim as new and desire to secure by Letters Patent of the United States is:

1. In a rolling mill of the type having a plurality of stands through which a strip of material to be reduced in thickness is passed, each of the stands comprising a pair of opposed rolls rotating at a predetermined speed, the method of reducing material to a final thickness which comprises passing the material through the stands in succession, applying pressure on the material in each stand, maintaining the speed of the rolls in each stand at a fixed predetermined speed, sensing the tension in the material before it enters a pair of stands, and varying the pressure on the material at the next stand in accordance with variations in the tension in the material before it enters the stand to maintain the mass flow of the material constant throughout the mill.

2. In a rolling mill consisting of a first stand, a final stand, and a plurality of intermediate stands, each of the stands comprising a pair of opposed rolls operating at a predetermined speed, the method of reducing material being rolled to a final desired thickness while maintaining constant the mass flow of the material through the mill comprising passing the material through the stands in succession, applying pressure on the material in each stand, measuring the thickness of the material after it leaves the first stand and controlling the pressure in the first stand to obtain a desired thickness, maintaining the speed of the rolls in the intermediate stands at a fixed predetermined speed, sensing the tension in the material before it enters an intermediate stand and controlling the pressure applied to the material in such stand in accordance with the tension therebefore.

3. The process of claim 2 in which the thickness of the material is measured after it leaves the final stand and the speed of the roll in the final stand is varied in accordance with such measurement.

4. In a multi-stand rolling mill comprising a first stand, a final stand and a plurality of intermediate stands, each of the stands comprising a pair of material engaging rolls, the combination comprising an X-ray thickness gage means positioned between said first stand and the first of the intermediate stands for regulating the force exerted between the material engaging rolls of the first of said stands, means for maintaining the speed of the rolls in each intermediate stand at a fixed predetermined speed, and means positioned before each of said intermediate stand for sensing the tension in a strip passing through said intermediate stand, said tension sensing means being operative to control the force between the rolls of the following intermediate stand, whereby the thickness of a strip delivered by an intermediate stand varies with the tension in the strip in advance of such intermediate stand.

5. In a rolling mill comprising a first stand, a final stand and a plurality of intermediate stands, each of the stands including a pair of material engaging rolls, drive means for said rolls, and a screwdown motor for controlling the pressure exerted by said rolls upon a strip of material passing therebetween, means for maintaining the speed of the rolls in the intermediate stands at fixed predetermined values, means for sensing the tension in a strip being rolled prior to its passage to one of the intermediate stands, said tension sensing means being operative to control the screwdown motor and the force between the rolls of said one intermediate stand whereby the thickness of a strip delivered by said intermediate stand varies with the tension in the strip in advance of said stand.

6. In a rolling mill comprising a first stand, a final stand, and a plurality of intermediate stands, each stand including a pair of material engaging rolls, drive means for said rolls, and a screwdown motor for controlling the pressure exerted by said rolls upon a strip of material passing therebetween, an X-ray thickness gage positioned between said first stand and the first of the intermediate stands for regulating the force exerted between the material engaging rolls of said first stand, means engaging the strip before it passes into an intermediate stand for sensing the tension in the strip passing through such intermediate stand, means responsive to said tension sensing means for controlling the screwdown motor of the next succeeding intermediate stand whereby the force exerted between the pair of rolls of the next succeeding intermediate stand varies with tension in the strip prior to its passage through the rolls of such intermediate stand, means for maintaining the speed of the rolls of the intermediate stands at fixed predetermined values, and means for measuring the thickness of the strip after it leaves said last stand, said last means being connected to control the speed of rotation of the rolls of said last stand.

7. In the rolling mill of claim 6 a penultimate stand, means for sensing the tension in a strip prior to its passing into the final stand and means controlled by said last means for controlling the speed of the pair of rolls of said penultimate stand.

References Cited by the Examiner
UNITED STATES PATENTS

| 2,180,635 | 11/39 | Iversen | 80—35.1 |
| 2,287,851 | 6/42 | Zeitlin | 80—35.1 |
| 2,300,990 | 11/42 | Stoltz | 80—35.1 |
| 2,345,765 | 4/44 | Michael | 80—35.1 |
| 2,348,695 | 5/44 | Reichert | 80—35.1 |
| 2,767,603 | 10/56 | Rendel | 80—56.1 |
| 2,767,604 | 10/56 | Whalen | 80—56.1 |
| 3,101,016 | 8/63 | Gill | 80—35.1 |

OTHER REFERENCES

Control Engineering, September 1956, pages 116–117.
Automation, March 1956, pages 52–57.
Wire, July 1961, pages 884, 926, 927.

WILLIAM J. STEPHENSON, *Primary Examiner.*
LEON PEAR, *Examiner.*